United States Patent [19]
Humiston

[11] 3,957,588
[45] May 18, 1976

[54] EVAPORATIVE AND CENTRIFUGAL APPARATUS FOR EFFECTING CONCENTRATION AND/OR PURIFICATION OF FEED STOCKS

[75] Inventor: Gerald F. Humiston, South Barre, Vt.

[73] Assignee: Pollution Control, Inc., South Barre, Vt.

[22] Filed: May 29, 1975

[21] Appl. No.: 581,801

Related U.S. Application Data

[62] Division of Ser. No. 369,515, June 13, 1973, Pat. No. 3,893,894.

[52] U.S. Cl............................... 202/172; 202/175; 202/177; 202/235; 203/24; 203/26; 203/78; 203/82; 203/84; 203/94; 159/6 R; 159/24 R; 159/17 VS

[51] Int. Cl.²...................... B01D 3/00; B01D 1/00; B01D 1/22

[58] Field of Search............ 159/6 W, 24 A, 17 VS, 159/17 R, 24 R, 1 C, 24 B, 6 R, DIG. 32, 47 R, 20 R; 203/10, 11, 24, 89, 26, 100; 202/235, 236, 176

[56] References Cited
UNITED STATES PATENTS

| | | | |
|---|---|---|---|
| 3,091,098 | 5/1963 | Bowers | 159/24 A |
| 3,118,775 | 1/1964 | Byer et al. | 159/20 R |
| 3,192,130 | 6/1965 | Pottharst, Jr. | 203/26 |
| 3,226,306 | 12/1965 | Hausner | 159/24 A |
| 3,496,240 | 2/1970 | Sturzenegger | 203/89 |
| 3,725,205 | 4/1973 | Heen | 203/26 |
| 3,725,206 | 4/1973 | Foley | 159/24 R |

*Primary Examiner*—Jack Sofer

[57] ABSTRACT

A low temperature purification system is provided which is particularly adapted for use to mechanically purify in a continuous operation solutions containing solids and dissolved substances. The purification system includes a solution supply means, and a centrifugal vacuum evaporator to which the solution to be purified is fed. Drive means is operatively connected to the evaporator for subjecting the solution within the evaporator to centrifugal acceleration and causes the solids in the solution to be displaced outwardly of the axis of rotation of the solution and the liquid of the solution to be displaced inwardly toward the axis of rotation. Outlet means is embodied in the evaporator for discharging the solids therefrom. The liquid as it is being displaced inwardly is simultaneously subjected to a reduced pressure to produce vapor which is conducted to a condenser means wherein the vapor is condensed to a substantially pure liquid. Heat pump means is provided in the system including the centrifugal vacuum evaporator and the condenser means to transfer the heat of condensation absorbed by the condenser means to the solution in the centrifugal vacuum evaporator to supply heat to the solution in the evaporator to replace the heat lost therein as the liquid is transformed to vapor whereby the solution within the evaporator is maintained above a predetermined minimum temperature. The heat pump means includes mechanical means for providing additional heat energy in the system to provide a temperature for the vapors being condensed above that of the solution being withdrawn from the solution supply means. This mechanical means is preferably blower means increasing its saturation pressure of the vapors which are brought into heat exchange contact with the solution in the condenser means to effect heat transfer therewith.

30 Claims, 2 Drawing Figures

EVAPORATIVE AND CENTRIFUGAL APPARATUS FOR EFFECTING CONCENTRATION AND/OR PURIFICATION OF FEED STOCKS

CROSS REFERENCE TO RELATED APPLICATION

The present application is a division of copending application Ser. No. 369,515 filed June 13, 1973 now U.S. Pat. No. 3,893,894 and entitled A LOW TEMPERATURE PURIFICATION SYSTEM, now U.S. Pat. No. 3,893,894 granted July 8, 1975.

BACKGROUND OF THE INVENTION

As is recognized by all, many applications exist which require the use of solutions from which solids and dissolved substances have been separated. Many processes have been developed heretofore for purposes of accomplishing this function of separation. One technique which has commonly been employed to remove solids from a solution is centrifugal separation. However, although centrifugal separation has proven to be highly effective for separating solids from a solution, it is not particularly a useful technique for the removal of dissolved substances from a solution and may even promote the retention of the dissolved substances therein. Another problem associated with the technique of centrifugal separation is that extremely high levels of centrifugal acceleration require high speeds of rotation to produce the desired separation within a reasonable period of time.

Another technique which is well known in the prior art which has been employed for purposes of purifying solutins is that of vacuum distillation. Vacuum distillation is often effective in removing solid substances from a solution because, as the solution is continuously evaporated, the dissolved substances accumulate and eventually precipitate from solution, thereby becoming just one more solid to be removed. One of the problems encountered with vacuum distillation, however, is that large concentrations of solids interfere with the surface evaporation rates thereby slowing down the process. Another difficulty has been adequately providing for the continuous removal of the solids remaining after the solution has been distilled. Another problem associated with the technique has been the difficulty of exposing sufficient surface area of the solution to the vacuum to achieve an acceptable rate of evaporation.

In an effort to obviate the difficulties described hereinabove which characterize the technique of centrifugal separation as well as that of vacuum distillation, a process and apparatus adapted to provide for the continuous mechanical purification of a solution containing solids and dissolved substances therein has been developed, and comprises the subject matter described and claimed in copending patent application, Ser. No. 303,425, filed on Nov. 3, 1972, which is entitled LIQUID PURIFICATION APPARATUS AND PROCESS, now U.S. Pat. No. 3,837,491 granted Sept. 24, 1974. The apparatus described therein is operable for separating the solids and the dissolved substances from the solution in a rapid and economical manner, and provides for the effective removal of the separated solids. This is accomplished by subjecting the solution simultaneously to both centrifugal separation and vacuum distillation.

The mode of operation of the apparatus of the afore-referenced copending patent application is such that the temperature of the solution therein will drop as the latent heat of vaporization drains heat from the solution as liquid is vacuum boiled off the solution. As a result heat must be added to the solution in order to replace that lost and maintain a constant or minimum temperature for the solution present in the apparatus. Since the liquid which is vaporized is subsequently condensed, and since the heat produced during condensation equals substantially heat loss occurring during vaporization, it is therefor desirable to provide a system in which the apparatus is associated with means operable for transferring the heat from condensation to replace the heat required for vaporization and to provide additional heat energy to compensate for other losses. The present invention is directed to a system embodying such means.

Accordingly, it is an object of the present invention to provide a novel and improved low temperature purification system which is operable to mechanically purify a solution in a continuous operation by separating therefrom the solids and dissolved substances contained therein.

It is also an object of the present invention to provide such a low temperature purification system which eliminates the need to provide an external heat source for supplying heat to offset the heat loss which occurs during vaporization.

It is another object of the present invention to provide such a low temperature purification system wherein a means is provided that is operable to replace the heat that is lost during the vaporization of the liquid of the solution to form liquid vapor, by transferring back to the solution the heat that is produced when this liquid vapor is condensed whereby to maintain the temperature of the solution substantially constant or above a preselected minimum.

It is still another object of the present invention to provide such a low temperature purification system wherein the heat transfer means is operatively connected in the system incuding the vaporizing means and the condensing means.

A further object of the present invention is to provide such a low temperature purification system wherein the condensing means is connected in the system between the means wherein the liquid of the solution is vaporized and the vacuum pump which is operable to pump the liquid vapor whereby to enable a smaller size vacuum pump to be utilized in the system since the major portion of the vacuum can be produced as a result of the condensation process.

Yet another object of the present invention is to provide such a low temperature purification system which is highly effective to purify solutions by removing therefrom solids and dissolved substances contained therein while yet embodying components which are relatively inexpensive to manufacture and relatively easy to employ.

SUMMARY OF THE INVENTION

It has now been found that the foregoing and related objects can be readily attained in a novel and improved low temperature purification system which is particularly adapted to be used for mechanically purifying a solution by separating therefrom solids and dissolved substances contained therein. The purification system includes a centrifugal vacuum evaporator, means for supplying to the vaporizer solution to be purified, and drive means operatively connected to the evaporator for subjecting the solution contained therein to centrifugal acceleration thereby to displace the solids contained therein outwardly from the axis of rotation of the rotating portion of the evaporator. The system also includes outlet means connected to the evaporator operable for discharging separated solids therefrom. As a result of the centrifugal acceleration which is imparted to the solution while the solids are being displaced outwardly, the liquid having dissolved substances therein is displaced inwardly toward the aforementioned axis of rotation. This liquid is subjected to vacuum distillation whereby the liquid is vaporized and the substances which have been dissolved therein are separated out as solids and are discharged from the evaporator in the same manner as that previously described for the other solids. The vapor is fed to a condenser wherein the vapor is condensed to provide pure liquid and means is provided in the system for removing this pure liquid therefrom. In addition, heat pump means is included in the system located between the centrifugal vacuum evaporator and the condensor to transfer the heat of condensation absorbed by the condenser back to the centrifugal vacuum evaporator thereby to supply heat to the solution in the evaporator to replace the heat which is lost as the liquid is being vaporized whereby to maintain the temperature of the solution within the evaporator above a preselected minimum.

The mechanical means providing heat energy in the heat pump means is preferably a blower which is located in the flow path between the centrifugal vacuum evaporator and the condenser whereby to a positioned in the path of flow of the liquid which has been vaporized. The blower is operable to increase the saturation pressure of the liquid vapor and, as the saturation pressure is increased, the temperature of the vapor also increases. Therefore, when the vapor is substantially condensed in the condenser, more heat is produced during the condensation process by the higher saturation pressure of the vapor. Thus, the use of such a blower comprises another way of eliminating or minimizing the need to provide an external heat source for adding heat to the solution to maintain the temperature thereof in the evaporation above a preselected minimum.

DETAILED DESCRIPTION OF THE ILLUSTRATED EMBODIMENTS

Figure 1:
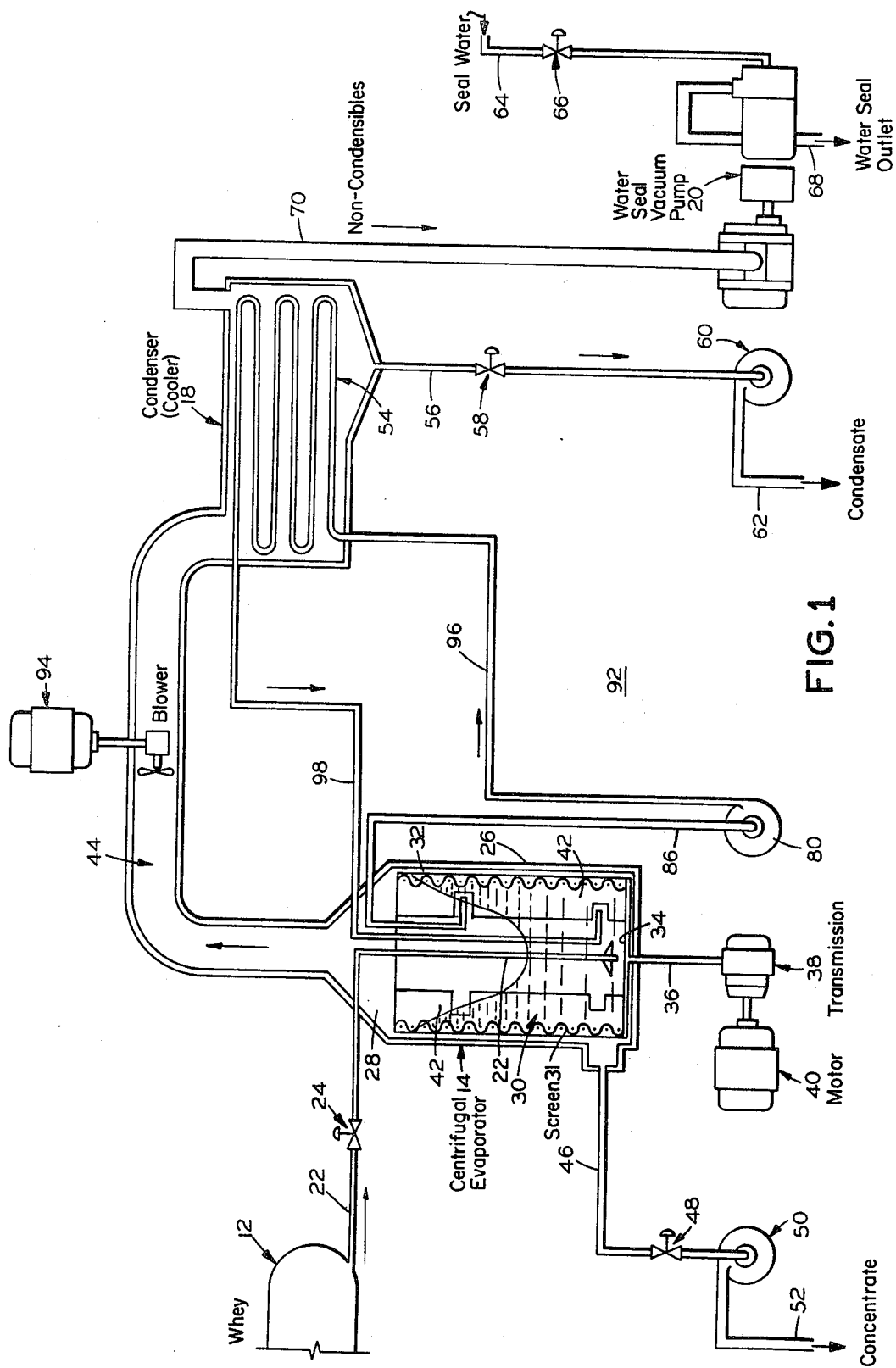
FIG. 1 is a schematic flow diagram of a low temperature purification system constructed in accordance with the present invention.

Referring now in detail to FIG. 1 of the drawings, therein illustrated is one embodiment of a low temperature purification system, constructed in accordance with the present invention, which functions to mechanically purify solutions by separating therefrom the solids and dissolved substances contained therein. More specifically, the system as depicted in FIG. 1 is particularly adapted to be employed to separate water from a whey solution whereby the outputs provided from the system 10 are in the form of whey concentrate and water.

The major components of the system illustrated in FIG. 1 of the drawings include a whey receiver generally designated by the numeral 12, a centrifugal vacuum evaporator generally designated by the numeral 14, a condenser generally designated by the numeral 18, and a vacuum pump generally designated by the numeral 20. The whey receiver 12 functions as a supply source, i.e., a reservoir for the whey solution which is to be purified, i.e., to be separated into whey concentrate and pure water as a result of the operation of the system 10. Conduit 22 connects the whey receiver 12 to the centrifugal vacuum evaporator 14 whereby to provide a path of flow therebetween for the solution. As shown in FIG. 1 of the drawings, a regulating valve 24 is preferably provided at a point located along the length of the conduit 22 intermediate the whey receiver 12 and the evaporator 14. The valve 24 is operable to regulate the flow of the whey solution from the whey receiver 12 to the evaporator 14.

With further reference to FIG. 1 of the drawings, the centrifugal vacuum evaporator 14 illustrated therein embodies the same structure as the centrifugal vacuum evaporator which comprises the subject matter of U.S. Pat. No. 3,837,491. Therefore, the structure of centrifugal vacuum evaporator 14 is not shown in detail in the drawings and will not be specifically described hereinafter. The only description thereof being included herein is that which is deemed necessary for one to obtain an understanding of the operation of the system 10 of the present invention. Thus, as depicted in FIG. 1, the evaporator 14 includes a stationary housing 26 which is generally cylindrical in shape and defines a generally cylindrically chamber 28 therewithin. A generally cylindrically shaped screen member generally designated by the numeral 30 is mounted for rotation within the chamber 28 and so as to be mounted concentric with the housing 26. The screen member 30 is of a lesser height than the housing 26 of the evaporator 14 and is also of a lesser diameter than the inside diameter of the housing 26 so as to be spaced apart therefrom to provide an annular spacing 32 therebetween to receive the whey solids which are separated from the whey solution in a manner yet to be described. Although not depicted in FIG. 1 of the drawings in the interest of maintaining clarity of illustration therein, it is nevertheless to be understood that the cylindrical metal wall 31 of the screen member 30 is provided with a plurality of small perforations suitably dimensioned to permit the whey solids which are being separated from the whey solution to pass therethrough to the annular spacing 32.

The screen member 30 is supported within the chamber 28 above the bottom thereof and is mounted for rotation about its axis therein by means of a drive shaft 36 connected to the base 34 of the screen member 30 through the housing 26. The drive shaft 36 in turn is operatively connected to a transmission drive means generally designated by the numeral 38 which is suitably driven by a conventional centrifuge drive motor generally designated by the numeral 40. Motor 40 is suitably selected thereby to be capable of rotating the drive shaft 36 and thereby the screen member 30 at a sufficiently high rate of speed so as to be capable of causing the desired separation to take place. A plurality of vanes 42 is formed as an integral part of the screen member 30 and they extend inwardly from the cylindrical side wall of the screen member 30 toward the axis of chamber 28. The vanes 42 are simply radially angled projections which are capable of engaging the whey solution and of causing rotation of the solution within the chamber 28. The screen member 30 with its vanes 42 rotate at high speed to effect centrifugal action within the chamber 28. The solution within the chamber 28, of course, develops the typical parabolic cavitational pattern of centrifuged solutions in a vertical chamber, adhering to the screen member 30 at the top thereof and also completely covering the base 34 of the screen member 30 as shown in phantom line in FIG. 1.

With reference further to FIG. 1 of the drawings, it can be seen therefrom that conduit 22, through which the whey solution is supplied to the evaporator 14 from the receiver 12, passes through the top wall of the housing 26 and extends downwardly into the interior of screen member 30 whereby the whey solution fed from receiver 12 is discharged at a point which is adjacent to the base 34 of screen member 30. Therefore, the whey solution is discharged somewhat below the level of the solution which is in the chamber 28, and accordingly it may be found necessary to feed the whey solution to the evaporator 14 at some positive pressure to prevent reverse flow of the solution from the chamber 28 through the conduit 22 to the receiver 12. The solution is preferably fed into the chamber 28 on a substantially continuous basis. This can be accomplished through proper operation of the aforedescribed regulating valve 24.

Conduit 44 interconnects the top of evaporator 14 with the condenser 18, and as such provides a means whereby a vacuum or reduced pressure is applied to the interior of chamber 28 of evaporator 14. This vacuum causes vaporization to take place of some of the liquid in the whey solution which is the portion thereof which is directed inwardly as a result of the centrifugal action to which the solution is subjected. In the course of time, the dissolved substances which are contained in the liquid portion of the solution which is being directed inwardly, will tend to accumulate within the chamber 28 at the axis thereof, eventually supersaturating the liquid portion of the solution and precipitating out for disposal as solids. The latter solids are then directed outwardly along with the other solids and pass through the small perforations provided in the screen member 30 into the annular spacing 32.

As depicted in FIG. 1 of the drawings, one end of a solids outlet conduit 46 is connected to the evaporator 14 adjacent to the bottom of housing 26. The conduit 46 is suitably connected to the evaporator 14 so as to be in communication with the annular spacing 32 which is formed between the housing 26 and the screen member 30 thereby to enable the solids passing radially outwardly from the chamber 28 through the perforations in screen member 30 into the annular spacing 32 to drop to the bottom of housing 26 whereby the solids are capable of moving into the outlet conduit 46 for removal from the evaporator 14. The rate at which solids, and more particularly in accordance with the embodiment of the invention being described the rate at which the whey solids are removed from the evaporator 14 is preferably controlled by means of a regulating valve 48 which is suitably mounted at a point along the length of the conduit 46 intermediate the ends thereof. As illustrated in FIG. 1 of the drawings, the other end of conduit 46 is connected to an outlet pump generally designated by the numeral 50 which is operable for purposes of pumping the whey solids discharged from the evaporator 14 through conduit 52 to a suitable receiver therefor (not shown).

Continuing with the description of a low temperature purification system shown in FIG. 1 of the drawings, the liquid portion of the whey is vaporized within the evaporator 14 in the manner described above. The vapors which are formed as a result of this vaporization process pass through conduit 44 into the condenser 18. These vapors which are received in the condenser 18 are made to pass around the coils 54 which are positioned within the condenser 18. In a manner yet to be described, cooler whey solution is made to flow through the coils 54 which are within the condenser 18. Thus, as the vapors are exposed to the coils 54, the vapors condense to form a "pure" liquid, i.e., water which is substantially free of solids and dissolved substances. The latter water is discharged from the condenser 18 by means of conduit 56. The rate of discharge is preferably controlled by means of regulating valve 58 which is suitably connected in line with the conduit 56 intermediate the ends of the latter. Moreover, in accordance with the form of the invention depicted in FIG. 1 of the drawings, a water outlet pump generally designated by the numeral 60 is preferably connected to the other end of conduit 56 and is operable for purposes of pumping the water, which is condensed within the condenser 18, through conduit 62 to a suitable receiving means (not shown) for the water.

As was set forth previously hereinabove, the low temperature purification system also includes a vacuum pump 20. In accordance with the embodiment of the invention depicted in FIG. 1 of the drawings, the vacuum pump 20 constitutes a water seal vacuum pump. Seal water is fed to the vacuum pump 20 by means of conduit 64 and the rate of flow thereof is controlled by means of the regulating valve generally designated by the numeral 66 located along the length thereof. The outlet for the seal water from the water seal vacuum pump 20 is through conduit 68. Vacuum pump 20 is connected to the condenser 18 by means of conduit 70 whereby a partial vacuum or reduced pressure is applied to the interior of condenser 18 and thereby the evaporator 14 where it is operable to cause the liquid portion of the whey solution to be vaporized in the manner previously described.

With reference to FIG. 1 of the drawings, it can be seen therefrom that the condenser 18 is located between the evaporator 14 and the vacuum pump 20. By so locating the condenser 18, it is possible to utilize a smaller size vacuum pump 20 in the system than would be required if the vacuum pump 20 were connected in the system between the evaporator 14 and the condenser 18. More specifically, as is well-known when the water is vaporized, it expands to a larger volume in the gaseous state as compared to the liquid. Consequently, a relatively large vacuum pump must be provided to pump this large gaseous volume which, if it were in a liquid state, would represent a relatively small amount of liquid. However, if the water vapor is condensed before reaching the vacuum pump, the condensing of the water vapor functions to essentially create a partial vacuum which is applied to the centrifugal vacuum evaporator 14. Therefore, by locating the condenser 18 between the evaporator 14 an the vacuum pump 20, the larger portion of the vacuum pumping which takes place in the low temperature purification system is done as a result of the condensation process thereby, leaving the prime function of the vacuum pump 20 to be removal of any non-condensibles which might be released during the evaporation process, and the removal from the system of any air leakage.

Because continuous vacuum distillation of the liquid portion of the whey solution by itself may cause cooling of the remaining solution in the chamber 28 with a resultant increase in the viscosity thereof, and because the heat generated by the rapid rotation of the screen member 30 and the friction between the solution and the vanes 42 will ordinarily be insufficient to compensate for such cooling, it is desirable to provide some mechanism by which heat energy can be positively introduced into the solution within the housing 20 of the evaporator 14 above that provided through the rotational action so as to prevent excessive chilling of the solution within chamber 28.

In the illustrated embodiment heat transfer and balance is achieved by pumping a portion of the solution from the chamber 28 directly to the condenser 18 and by mounting a blower 94 in the conduit 44 for a purpose yet to be described. The pump 80 is operable for purposes of pumping the solution from the evaporator 14 through the coils 54 of the condenser 18 wherein the solution is heated and then returned to the evaporator 14. For this purpose, one side of pump 80 is connected by means of conduit 96 to the coils 54 of conduit 18. The other side of the pump 80 is connected by conduit 86 to the interior of the chamber 28 of evaporator 14. The other end of the coils 54 in condenser 18 is connected by means of conduit 98 to the interior of the chamber 28. It will be noted that the conduit 98 terminates adjacent the base 36 of the screen member 30 and near the point at which solution from the receiver 12 is discharged into the chamber 28 by the conduit 22.

Turning now to a description of the function of the blower 94, the latter is operable for purposes of increasing the saturation pressure of the vapors which pass through the conduit 44 after being produced in the evaporator 14 and before the vapors are condensed by virtue of being exposed to the coils 54 in condenser 18. As is known to those skilled in the art, raising the saturation pressure of water vapor produces an accompanying increase in the temperature thereof. For example, if the saturation pressure of the water vapor measured at a point in the conduit 44 upstream from the blower 94 is 1.0 psi the temperature of the water vapor will be approximately 101°F. However, if the saturation pressure of the water vapor in the conduit 44 is raised through the action of the blower 94 so that the saturation pressure of the water vapor measured downstream of the blower 94 is increased to 2.0 psi, the temperature of the water vapor will be approximately 136°F. Moreover, even if the blower 94 is operable to only increase the saturation pressure to 1.5 psi, a temperature rise to approximately 115°F. will still be achieved. It can thus be understood that increasing the saturation pressure of the water vapor as the latter passes through the conduit 44 is effective to increase the amount of heat available for absorption in the condenser 18 when the water vapor condenses therein, and thereby as a result the amount of heat which is transferred to the solution flowing in the coils 54 of the condenser 18. The blower 94 and the method of use thereof as described above therefore comprises a means whereby heat is capable of being transferred from the condenser 18 back to the solution which is in chamber 28 of the evaporator 14 to replace the heat loss which occurs in the latter when vaporization occurs therein thereby to maintain the temperature of the solution substantially constant or above a preselected minimum temperature without requiring that the evaporator 14 be provided with some form of external heat source.

Turning now to a description of the operation of the system of this embodiment, whey containing solids and dissolved substances is fed from the receiver 12 to the centrifugal vacuum evaporator 14 wherein the screen member 30 is rotating at a high rate of speed to subject the whey to centrifugal action. The solids contained in the whey travel outwardly through the screen member into the annular spacing 32 and are discharged through the conduit 46, valve 48, pump 50 and conduit 52. Because of the reduced pressure within the evaporator 14, the water component is vaporized and flows through the conduit 44 to the condenser 18a. As it is flowing to the condenser, the blower 94 increases the saturation pressure of the vapor. The vapors which are at a higher temperature than the whey flowing through the coil 54 condense as they come into contact with the coil 54. The condensed water is then discharged through the conduit 56, valve 58, pump 60 and conduit 62.

In this embodiment, the whey being circulated through the coil 54 of the condenser 18 is being extracted from the centrifugal evaporator 14 through the conduit 86, pump 80 and conduit 96; it is returned to the evaporator through the conduit 98. Vacuum at startup and as required during operation is provided by the vacuum pump 20 which is coupled to the discharge side of the condenser 18a through the conduit 70; as will be readily appreciated, the condensation of the water in the condenser will in and of itself produce a partial vacuum within the upstream end of the assembly.

Figure 2:
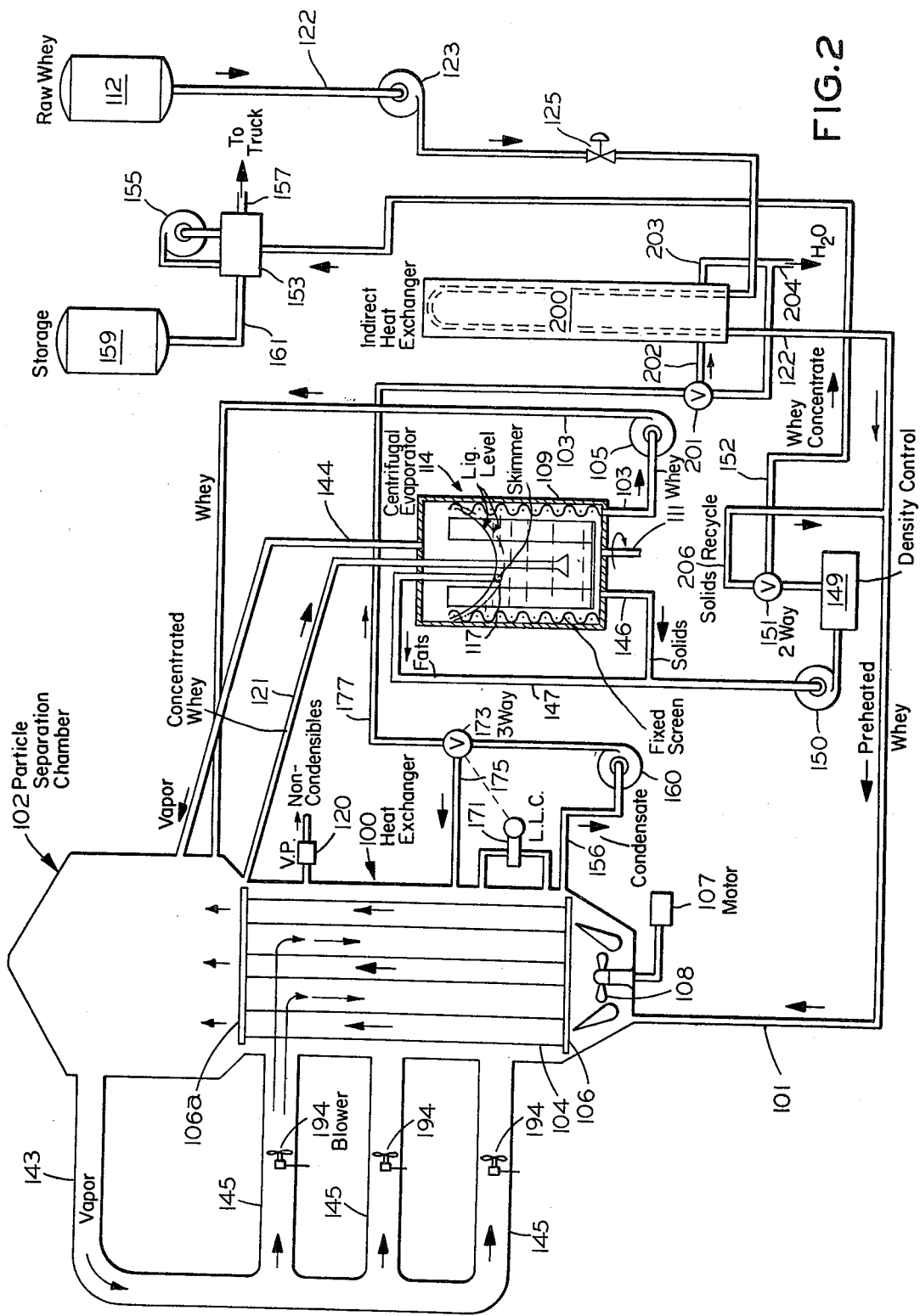
FIG. 2 is a schematic flow diagram of another embodiment of low temperature purification systems constructed in accordance with the present invention.

Turning now to FIG. 2 of the attached drawings, therein illustrated is a whey concentrating assembly wherein the centrifugal evaporator is coupled with a tube-type heat exchanger to effect optimum concentration within a relatively short period of time and to process a composition containing both fats and dissolved solids. In this embodiment, the centrifugal evaporator generally designated by the numeral 114 and the tube-type heat exchanger generally designated by the numeral 100 cooperate in effecting the evaporation of water from the raw whey being processed. The details of the centrifugal evaporator 114 are omitted for ease of illustration but it contains a rotating member 115 within a housing 109 as in the instance of the embodiment of FIG. 1. Rotation is effected by a gear & drive assembly generally designated by the numeral 111. Liquid-solids suspension is moved outwardly by rotation of member 115 and exits by line 146. A skimmer 117 disposed adjacent the central portion of the centrifugal evaporator 114 serves to skim off fats and the like which are floating on the surface of the liquid and they are discharged through the conduit 147 which feeds into the conduit 146 and the fats and solids are transported to the density control mechanism 149 by the pump 150.

Depending upon the density observed, the controller 149 will operate the valve 151 to pump the concentrated material through the conduit 152 to the controller 153 which will operate the pump 155 to pump to a truck or the like through the conduit 157 or to a storage tank 159 through the conduit 161. Whey is introduced into the centrifugal evaporator 114 through the conduit 121 and into which partially concentrated whey in the evaporator overflows. Vapors from the centrifugal evaporator 114 pass through the conduit 144 to the particle separation chamber 102. Whey is circulated between the heat exchanger 100 and centrifugal evaporator 114 through conduit 103 by action of the pump 105 for a purpose to be explained fully hereinafter. Raw whey enters the heat exchanger 100 through the conduit 101 and passes upwardly therethrough under action of the impeller 108 which is driven by the motor 107 through elongated tubes 104 seated in either end in tube sheets 106, 106a. As the whey passes upwardly through the tubes 104 it is in indirect heat exchange contact with vapor which has been compressed by blower 44 so that its temperature is elevated and water is evaporated therefrom. As the whey exits from the upper tube sheet 106, the whey overflows into the conduit 121 and passes to the centrifugal evaporator 114. Steam and other vapors discharging from the tubes 104 and from the centrifugal evaporator 114 through the conduit 144 pass into the particle separation chamber 102 which also serves as a plenum chamber. Solids entrained in the vapor fall downwardly into the whey concentrate which overflows into the centrifugal evaporator 114.

The steam and other vapors in the particle separation chamber 102 pass outwardly through the conduit 143 and are channeled into heat exchanger contact with the exterior of the tubes 104 through the conduits 145. Booster fans 194 are provided in each of the conduits 145 to increase the saturation pressure of the vapor before introduction into the heat exchanger 100.

As the steam vapor passes in contact with the heat exchange tubes 104, it loses heat to the whey which is passed upwardly therethrough and condenses. The water resulting from the condensation collects at the bottom of the heat exchanger and is withdrawn through the conduit 156 by action of the pump 160. A water level control mechanism 171 maintains a desirable water level in the base of the heat exchanger and controls the valve 173 so that water may be recycled to the heat exchanger through the conduit 175 or towards discharge through the conduit 177. The hot water passing towards discharge may be used to preheat the whey by passing it in heat exchange contact with the whey entering the system in the heat exchanger generally designated by the numeral 200. The valve 201 is effective to divert water in the conduit 177 through the conduit 202 into the heat exchanger 200 from which it then flows to the conduit 203 to the discharge line 204. Raw whey enters the system from the storage tank 112 through the conduit 122 by action of the pump 123. A valve 125 is provided in the conduit 122 prior to the heat exchanger 200 and the conduit 122 ultimately feeds into the feed conduit 101 for the heat exchanger 100. As can be seen, the valve 151 which is operated by the controller 149 may operate to recycle whey concentrate through the conduit 206 into the conduit 122.

In order to provide the reduced pressure within the system initially and to compensate for noncondensibles, a vacuum pump generally designated by the numeral 120 communicates with the shell side of the heat exchanger 100. However, the bulk of the vacuum within the system is provided by the effect of condensation of the large volume of vapors within the heat exchanger.

In the operation of this embodiment, the primary evaporative function takes place in the heat exchanger 100 with secondary evaporation and separation of fats and solids taking place in the centrifugal evaporator 114. The heat necessary to offset loses in the system and maintain the evaporative action is provided almost entirely by the action of the blowers 194 although some mechanical energy is also introduced through the other pumps and through the rotation of the member 115 in the centrifugal evaporator 114.

The raw whey is fed into the system from the tank 112 through the heat exchanger 200 wherein it may be preheated through the heat exchange contact with the condensed water being removed from the main evaporator 100. The inlet flow continues on through the conduit 122 and thence into the conduit 101 which feeds the evaporator 100. The impeller 108 assists the upward flow of the whey through the tubes 104 wherein the whey is elevated in temperature by heat exchange contact with vapor being introduced into the casing of the heat exchanger 100 throught the conduits 145. As has been hereinbefore described, the blowers 194 increase the saturation pressure of the vapor prior to its introduction into the heat exchanger 100 and, as the vapor circulates about the tubes 104, it condenses and surrenders the heat of condensation to the whey which is passing upwardly through the tubes 104. The heat that is thus recovered from the condensing vapors causes the water in the whey to evaporate as the whey flows outwardly at the top of the tubes and the vapors thus produced pass upwardly into the particle separation chamber 102 wherein any entrained solids drop out and into the body of the liquid whey in the lower portion thereof. The condensed water drops to the bottom of the shell of the heat exchanger 100 and is removed therefrom through the conduits 156 and 177 by action of the pump 160. The water level is sensed and controlled by the controller 171 which is effective to divert water through the valve 173 and conduit 175 into the heat exchanger 100 to maintain a desirable water level at the bottom thereof. As has been hereinbefore described, the hot water which is thus recovered may be diverted by the valve 201 through the conduit 202 into the heat exchanger 200 to preheat the whey which is being introduced into the system before the water is ultimately discharged through the conduit 204.

The vapors generated by the whey flowing upwardly through the tubes 104 exit from the particle separation chamber 102 through the conduit 143 and are fed into the several branch conduits 145 wherein the blowers 194 increase the saturation pressure thereof prior to introduction into the shell of the heat exchanger 100 as has been hereinbefore described.

The relatively concentrated whey solution which exits from the top of the tubes 104 overflows into the conduit 121 which transports it to the centrifugal evaporator 114. Therein, the whey solution is subjected to centrifugal action and reduced pressure as well as a skimming action. The centrifugal action is as has been described hereinbefore and the solids exit through the conduit 146. The skimmer 117 serves to skim off a portion of the surface of the liquid adjacent the center of the chamber which has been determined to contain a large quantity of fatty materials and this skimmed portion is removed from the centrifugal evaporator 114 through the conduit 147 and is combined with the solids in the conduit 146. This combined concentrated material is transported by the pump 150 through the controller 149 to determine the level of concentration therein and may then be recycled by operation of the valve 151 through the conduit 206 into the inlet conduit 122 or it may be directed towards storage or discharge through the conduit 152.

Vapors which are generated within the centrifugal evaporator 114 exit through the conduit 144 and are directed into the particle separation chamber 102 wherein they combine with the vapors produced within the heat exchanger 100 and exit therefrom through the conduit 143.

In order to maintain desired fluid level within the centrifugal evaporator 114 and to avoid excessive cooling action resulting from evaporation, whey solution is constantly being circulated between the centrifugal evaporator 114 and the body of the whey solution at the top of the heat exchanger 100 by action of the pump 105 through the conduit 103.

As will be readily appreciated, the condensation of the vapor generated from the whey solution flowing in the tubes 104 produces a vacuum within the downstream end of the system which is thereby operative to provide the reduced pressure within the heat exchanger 100 and within the centrifugal evaporator 114. However, since there may be noncondensibles present and since it is necessary to initially establish the reduced pressure within the system, the vacuum pump 120 is operative to maintain the desired reduced pressure within the system and is coupled to the upper portion of the shell of the heat exchanger 100.

Illustrative of the efficacy of the system of the embodiment of FIG. 2 are the following process conditions. Raw whey of 6 percent solids concentration and a temperature of about 49°–52°C. is utilized as a feed stock for the system. If the temperature of the whey feed stock is below about 49°C., the hot water effluent is brought into contact therewith in the heat exchanger 200. The tube-type heat exchanger 100 contains approximately 1200 tubes of 1-inch diameter and 12 feet in length and is constructed so as to provide two passes of the whey solution therethrough before discharge from the upper tube sheet 106. As the whey passes through the tubes, the steam which is at a temperature of about 58°C. and a pressure of about 2.6 psig is in heat exchange contact therewith and condenses on the outer surface of the tubes to provide heat of condensation to offset the heat required for evaporation of the water therein. The steam exiting from the tubes in the solid separator is found to have a temperature of about 52°C. and a pressure of about 1.7 psig. The three booster fans employed in the illustrated embodiment each have a capacity of 8,000 cfm and increase the saturation pressure from 1.7 psig to 2.6 psig and accordingly the steam temperature from 52°C. to 58°C. The superheat has been found to produce a temperature as high as 120°C. and it is desirable to spray water into the conduits at a rate of about 4 gallons per hour to remove the superheat.

A reservoir of water of about 6 to 8 inches is maintained at the bottom of the heat exchanger and the pressure within the heat exchanger and the centrifugal evaporator is at a level of about 1.7 psig and is maintained at this level by reason of the condensation of the large volume of water vapor within the system. To compensate for noncondensibles and to develop this desirable reduced pressure level during initial startup, the vacuum pump is employed. The system is employed to concentrate the whey to 40 percent solids and has a throughput of 172,000 pounds of raw whey per 20 hour cycle.

Thus, it can be seen that the present invention provides a novel and improved low temperature purification system which is operable to mechanically purify a solution in a continuous operation by separating therefrom the solids and dissolved substances contained therein. Moreover, the low temperature purification system of the present system eliminates the need to provide a separate heat source for supplying heat to offset the heat loss which occurs during vaporization. In accordance with the present invention, the low temperature purification system provides a means operable to replace the heat that is lost during the vaporization of the liquid of the solution to form vapor by transferring back to the solution the heat that is produced when this vapor is condensed to maintain the temperature of the solution substantially constant or above a preselected minimum temperature. In the low temperature purification system of the present invention, the heat transfer means is operatively connected in the system comprising the vaporizing means and the condensing means. In addition, in accordance with the present invention a low temperature purification system has been provided wherein the condensing means is connected in the system between the means wherein the liquid of the solution is vaporized and the vacuum pump which is operable to pump the liquid vapor whereby to enable a smaller size vacuum pump to be utilized in the system since the major portion of the reduced pressure effect can than be accomplished as a result of the condensation process. The low temperature purification system is highly effective to purify solutions by removing therefrom solids and dissolved substances contained therein while embodying components which are relatively inexpensive to manufacture and relatively easy to employ.

Having thus described the invention, I claim:

1. A low temperature purification system operable for purposes of separating from a feed solution the solids and dissolved substances contained therein comprising:
   a. a source of supply of a solution containing solids and dissolved substances;
   b. a centrifugal vacuum evaporator in communication with the source of supply for receiving solution therefrom operable to separate solids from the solution by centrifugal acceleration and to separate dissolved substances from the solution by vacuum distillation, said centrifugal vacuum evaporator including a stationary housing providing a chamber, rotatable means within said chamber for rotation of solution therewithin, drive means connected to said rotatable means operable for causing the rapid rotation of said rotatable means, an inlet for solution containing solids and dissolved substances, an outlet for solids adjacent the base of said chamber and an outlet for vapors adjacent the top of said chamber, said inlet for said centrifugal vacuum evaporator being in communication with said source of supply, and said chamber, source of supply and the connection therebetween comprising the solution intake portion of the purification system;
   c. vacuum means operable for producing a vacuum;
   d. indirect condenser means connected between said vapor outlet of said centrifugal evaporator and said vacuum means, said condenser means being operable at reduced pressure during operation of said vacuum means and said condenser means in turn producing a reduced pressure within said centrifugal evaporator to cause at least a portion of the solution in said centrifugal evaporator to vaporize to produce vapors therefrom for transmission to said condenser means, said condenser means including heat exchange tubing supported therewithin in the path of flow of the vapors received from said centrifugal evaporator, the interior of said tubing being in communication with said solution intake portion to provide solution flowing therethrough at a temperature below the condensation temperature of the vapors to cause the vapors coming into contact with said tubing to condense to produce a cendensate with the heat produced during condensation being absorbed by the solution flowing through said tubing;

e. outlet means connected to said condenser means for discharging the condensate therefrom; and f. heat recovery means comprising first conduit means communicating with said solution intake portion and the inlet end of said tubing supported in said condenser means, mechanical means for providing additional heat energy in the system to provide a temperature in the vapors being condensed above that of the solution flowing through said condenser means, and second conduit means connecting the discharge end of said tubing supported in said condenser means to said contrifugal vacuum evaporator thereby establishing a flow loop between said source of supply, said centrifugal vacuum evaporator and said tubing supported in said condenser means by means of said first and second conduit means through which solution passes from said source of supply through said tubing of said condenser means wherein the solution is heated by the heat produced during condensation thereby increasing the temperature of the solution before the latter is charged to said centrifugal vacuum evaporator wherein the heated solution mixes with the solution in said centrifugal vacuum evaporator to effect direct heat transfer therewithin and cause the temperature of the solution in said centrifugal vacuum evaporator to remain above a preselected minimum temperature as a result of the heat which is lost during evaporation in said centrifugal vacuum evaporator being replaced by the heat which is produced during condensation in said condenser means.

2. The low temperature purification system as set forth in claim 1 wherein said mechanical means for providing additional heat energy comprises a blower in the conduit between the evaporator and condenser means operable to increase the saturation pressure of the vapors between it and the condenser, thereby increasing the temperature thereof.

3. The low temperature purification system as set forth in claim 1 wherein said condenser means include a particle separation chamber at the discharge end of said tubing into which vapors emanating from said tubing and from said centrifugal vacuum evaporator pass and from which the vapors are conducted into contact with the exterior of the tubing in said condenser means.

4. The low temperature purification system as set forth in claim 1 wherein said system additionally includes a primary indirect heat exchanger in the conduit from said source of supply for passage of the solution therethrough, said primary heat exchanger being connected to the outlet means of said condenser means for passage of the condensate in indirect heat exchange contact with said solution to effect heat transfer thereto.

5. The low temperature purification system as set forth in claim 1 wherein said centrifugal vacuum evaporator includes skimmer means disposed within said chamber for skimming a surface portion of the solution within said chamber.

6. The low temperature purification system as set forth in claim 1 wherein said system includes density sensing means connected to the outlet of said centrifugal vacuum evaporator for sensing density of the material being discharged from said outlet and operative to recycle the material to said solution intake portion when the material is below a predetermined value.

7. The low temperature purification system as set forth in claim 1 wherein said heat recovery means includes a pump in said first conduit means connected between said solution intake portion and to the inlet end of said tubing in said condenser means.

8. The low tempeature purification system as set forth in claim 7 wherein said inlet for said centrifugal vacuum evaporator is connected directly to said source of supply of solution and wherein said heat recovery means is connected to said chamber of said centrifugal vacuum evaporator to withdraw solution therefrom for passage through said tubing of said condenser means.

9. The low temperature purification system as set forth in claim 1 wherein said inlet of said centrifugal vacuum evaporator is in communication with the discharge end of said tubing in said condenser means whereby the solution being discharged from said tubing of said condenser means comprises inpart the source of supply of solution for said centrifugal vacuum evaporator.

10. The low temperature purification system as set forth in claim 9 wherein said inlet end of said tubing in said condenser means is in communication with said source of supply of said solution and wherein liquid is initially evaporated from solution in said condenser means prior to passage to said centrifugal vacuum evaporator.

11. The low temperature purification system as set forth in claim 10 wherein said centrifugal vacuum evaporator is in communication with said condenser means by third conduit means and a pump within said third conduit means transports solution from said chamber to said condenser means to effect circulation between the solution in said chamber and the body of solution being discharged from the outlet end of said tubing.

12. The low temperature purification system as set forth in claim 1 wherein said condenser means comprises a tube and shell heat exchanger containing a multiplicity of spaced tubes supported between tube sheets and providing said heat exchange tubing, said condenser means including a plenum chamber at the discharge end of said tubes and vapor conveying third conduit means connecting between said plenum chamber and the shell of said heat exchanger.

13. The low temperature purification system as set forth in claim 12 wherein said mechanical means for providing additional heat energy comprises a blower in said third conduit means between said plenum chamber and shell of said heat exchanger operable to increase the saturation pressure of the vapors passing therethrough and thereby increasing the temperature thereof.

14. A low temperature purification system operable for purposes of separating from a feed solution the solids and dissolved substances contained therein comprising:
   a. a source of supply of a solution containing solids and dissolved substances;
   b. a centrifugal vacuum evaporator in communication with the source of supply for receiving solution therefrom operable to separate solids from the solution by centrifugal acceleration and to separate dissolved substances from the solution by vacuum distillation, said centrifugal vacuum evaporator including a stationary housing providing a chamber, an inlet for solution containing solids and dissolved substances, an outlet for solids adjacent to the base of said chamber and an outlet for vapors adjacent the top of said chamber;
   c. vacuum means operable for producing a vacuum;
   d. a tube and shell heat exchanger connected between said vapor outlet of said centrifugal evaporator and said vacuum means, said heat exchanger being operable at reduced pressure during operation of said vacuum means and said heat exchanger in turn producing a reduced pressure within said centrifugal evaporator to cause at least a portion of the solution in said centrifugal evaporator to vaporize to produce vapors therefrom for transmission to said heat exchanger, said heat exchanger having heat exchange tubing supported within said shell with an inlet at one end and an outlet at the other end thereof for passage of solution from the inlet to the outlet of said tubing, said shell of said heat exchanger having an inlet for vapors and providing a passageway for the vapors about the exterior of said tubing therewithin and further providing an outlet for condensate therefrom, said heat exchanger having a plenum chamber at the outlet end of said tubing and an outlet for solution discharged from the outlet end of said tubing, said inlet end for said tubing being in communication with said source of supply of solution, said inlet for vapors being connected to said plenum chamber and to said outlet for vapors of said centrifugal vacuum evaporator whereby vapors from the evaporation of solution in said centrifugal vacuum evaporator and in the tubing of said heat exchanger are directed into contact with said tubing to condense and produce a condensate with the heat produced during condensation being absorbed by the solution flowing through said tubing which is at a temperature below the condensation temperature of the vapors;
   e. an outlet conduit connected to said condensate outlet of said heat exchanger for discharging the condensate therefrom;
   f. heat recovery means including mechanical means for providing additional heat energy in the system to provide a temperature in the vapors being condensed within the heat exchanger above that of the solution flowing through said tubing, and a conduit for conveying said last mentioned heated solution to the inlet of said centrifugal vacuum evaporator to admix with the solution in said centrifugal vacuum evaporator to effect direct heat transfer therewithin and cause the temperature of the solution in said centrifugal vacuum evaporator to remain above a preselected minimum temperature as a result of the heat which is lost during evaporation being replaced by the heat which is produced during condensation in said heat exchanger.

15. The low temperature purification system as set forth in claim 14 wherein said heat recovery means includes a conduit between the plenum chamber and vapor inlet for said heat exchanger and a blower in the said conduit operable to increase the saturation pressure of the vapors between it and the heat exchanger inlet to thereby increase the temperature thereof.

16. The low temperature purification system as set forth in claim 14 wherein said heat exchanger includes a particle separation chamber at the discharge end of said tubing providing said plenum chamber.

17. The low temperature purification system as set forth in claim 14 wherein said system additionally includes a primary heat exchanger in the conduit from said source of supply for passage of the solution therethrough, said primary heat exchanger being connected to said outlet conduit for passage of the condensate into indirect heat exchange contact with said solution to effect heat transfer thereto.

18. The low temperature purification system as set forth in claim 14 wherein said centrifugal vacuum evaporator includes skimmer means disposed within said chamber for skimming a surface portion of the solution within said chamber.

19. The low temperature purification system as set forth in claim 14 wherein said system includes density sensing means connected to the solids outlet of said centrifugal vacuum evaporator for sensing density of the material being discharged from said outlet and operative to recycle the material to said tubing inlet end when the material is below a predetermined value.

20. The low temperature purification system as set forth in claim 14 wherein said conduit conveying heated solution to said inlet of said centrifugal vacuum evaporator is connected to said heat exchanger adjacent the discharge end of said tubing whereby the solution being discharged from said tubing of said heat exchanger comprises at least in part the source of supply of solution for said centrifugal vacuum evaporator.

21. The low temperature purification system as set forth in claim 20 wherein said inlet end of said tubing in said heat exchanger is in communication with said source of supply of said solution and wherein liquid is evaporated from said solution in said heat exchanger prior to passage to said centrifugal vacuum evaporator.

22. The low temperature purification system as set forth in claim 21 wherein said centrifugal vacuum evaporator is connected to said heat exchanger by a conduit and a pump within said conduit pumps solution from said chamber to said heat exchanger to effect circulation between the solution in said chamber and the body of solution being discharged from the outlet end of said tubing.

23. A low temperature purification system operable for purposes of concentrating whey comprising:
   a. a source of supply of whey;
   b. a centrifugal evaporator in communication with the source of supply for receiving whey therefrom and operable to separate solids from the whey, said evaporator including a stationary housing providing a chamber, an inlet for whey, an outlet for solids adjacent the base of said chamber, an outlet for vapors adjacent the top of said chamber, skimmer means within said chamber for skimming fats floating at the surface of the whey within said chamber, an outlet for fats skimmed by said skimmer means, and a whey concentrate conduit communicating with said fats and solids outlets;

c. vacuum means operable for producing a vacuum;

d. a tube and shell heat exchanger connected between said vapor outlet of said evaporator and said vacuum means, said heat exchanger being operable at reduced pressure during operation of said vacuum means and said heat exchanger in turn producing a reduced pressure within said evaporator to cause at least a portion of the whey in said separator to vaporize to produce vapors therefrom for transmission to said heat exchanger, said heat exchanger having heat exchange tubing supported within said shell with an inlet at one end and an outlet at the other end thereof for passage of whey from the inlet to the outlet of said tubing, said shell of said heat exchanger having an inlet for vapors and providing a passageway for the vapors about the exterior of said tubing therewithin and further providing an outlet for condensate therefrom, said heat exchanger having a plenum chamber at the outlet end of said tubing and an outlet for whey discharged from the outlet end of said tubing, said inlet end for said tubing being in communication with said source of supply of whey, said inlet for vapors being connected to said plenum chamber and in communication with said outlet for vapors of said evaporator whereby vapors from the evaporation of whey in said evaporator and in the tubing of said heat exchanger are directed into contact with the exterior of said tubing to cause the vapors coming into contact with said tubing to condense and produce a condensate with the heat produced during condensation being absorbed by the whey flowing through said tubing which is at a temperature below the condensation temperature of the vapors;

e. an outlet conduit connected to said condensate outlet of said heat exchanger for discharging the condensate therefrom;

f. heat recovery means including mechanical means for imparting addition heat energy to the vapors directed to the tubing in the system to provide a temperature in the vapors being condensed within the heat exchanger above that of the whey flowing through said tubing, and a conduit for conveying said last mentioned heated whey to the inlet of said evaporator to admix with the whey in said evaporator to effect direct heat transfer therewithin and cause the temperature of the whey in said evaporator to remain above a preselected minimum temperature as a result of the heat which is lost during evaporation being replaced by the heat which is produced during condensation in said heat exchanger.

24. The low temperature purification system as set forth in claim 23 wherein said heat recovery means includes a conduit between the plenum chamber and vapor inlet for said heat exchanger and a blower in the said conduit operable to increase the saturation pressure of the vapors between it and the heat exchanger inlet to thereby increase the temperature thereof.

25. The low temperature purification system as set forth in claim 23 wherein said conduit conveying heated whey to said inlet of said evaporator is connected to said heat exchanger adjacent the discharge end of said tubing whereby the whey being discharged from said tubing of said heat exchanger comprises in part the source of supply of whey for said evaporator.

26. The low temperature purification system as set forth in claim 25 wherein said inlet end of said tubing in said heat exchanger is in communication with said source of supply of said whey and wherein liquid is initially evaporated from said solution in said heat exchanger prior to passage to said evaporator.

27. The low temperature purification system as set forth in claim 23 wherein said system includes density sensing means connected to said whey concentrate conduit of said evaporator for sensing density of the whey concentrate being discharged through said conduit and operative to recycle the whey concentrate to said tubing inlet end when the whey concentrate is below a predetermined value.

28. A low temperature purification system operable for purposes of concentrating a feed solution comprising:

a. a source of supply of a solution containing solids and dissolved substances;

b. a centrifugal evaporator in communication with the source of supply for receiving solution therefrom operable to separate solids from the solution, said separator including a stationary housing providing a chamber, an inlet for solution containing solids and dissolved substances, an outlet for solids and an outlet for vapors;

c. vacuum means operable for producing a vacuum;

d. a tube and shell heat exchanger connected between said vapor outlet of said evaporator and said vacuum means, said heat exchanger being operable at reduced pressure during operation of said vacuum means and said heat exchanger in turn producing a reduced pressure within said evaporator to cause at least a portion of the solution in said evaporator to vaporize to produce vapors therefrom for transmission to said heat exchanger, said heat exchanger having heat exchange tubing supported within said shell with an inlet at one end and an outlet at the other end thereof for passage of solution from the inlet to the outlet of said tubing, said shell of said heat exchanger having an inlet for vapors and providing a passageway for the vapors about the exterior of said tubing therewithin and further providing an outlet for condensate therefrom, said heat exchanger having a plenum chamber at the outlet end of said tubing and an outlet for concentrated solution discharged from the outlet end of said tubing, said inlet end for said tubing being in communication with said source of supply of solution, said inlet for vapors being connected to said plenum chamber and to said outlet for vapors of said evaporator whereby vapors from the evaporation of solution in said evaporator and in the tubing of said heat exhanger are directed into contact with the exterior of said tubing to cause the vapors coming into contact with said tubing to condense and produce a condensate with the heat produced during condensation being absorbed by the solution flowing through said tubing which is at a temperature below the condensation temperature of the vapors;

e. an outlet conduit connected to said condensate outlet of said heat exchanger for discharging the condensate therefrom;

f. heat recovery means including mechanical means for providing additional heat energy to the vapors directed to the tubing in the system to impart a temperature to the vapors being condensed within the heat exchanger above that of the solution flowing through said tubing, and a conduit for conveying said last mentioned heated solution to the inlet of said evaporator to admix with the solution in said separator to effect direct heat transfer therewithin and cause the temperature of the solution in said evaporator to remain above a preselected minimum temperature as a result of the heat which is lost during evaporation being replaced by the heat which is produced during condensation in said heat exchanger.

29. The low temperature purification system as set forth in claim 28 wherein said heat recovery means includes a conduit between the plenum chamber and vapor inlet for said heat exchanger and said mechanical means comprises a blower in the said conduit operable to increase the saturation pressure of the vapors between it and the heat exchanger inlet to thereby increase the temperature thereof.

30. The low temperature purification system as set forth in claim 28 wherein said conduit conveying hot concentrated solution to said inlet of said evaporator is connected to said heat exchanger adjacent the discharge end of said tubing whereby the solution being discharged from said tubing of said heat exchanger comprises in part the source of supply of solution for said evaporator.

* * * * *